May 29, 1962 J. SONNBERG 3,036,738
APPARATUS FOR CONVEYING AND METERING MILK
Filed May 28, 1958
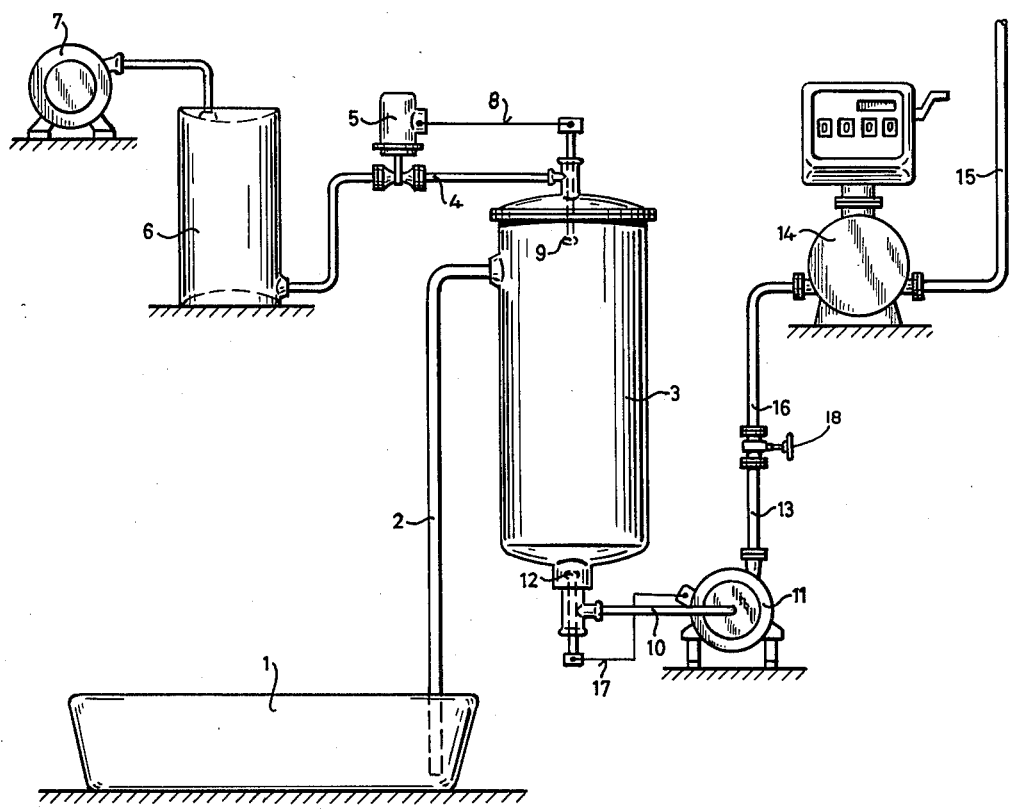
Inventor.
Joachim Sonnberg.

United States Patent Office 3,036,738
Patented May 29, 1962

3,036,738
APPARATUS FOR CONVEYING AND
METERING MILK
Joachim Sonnberg, Hildesheim, Germany, assignor to
Gebr. Diessel, Hildesheim, Hildesheim, Germany, a
German company
Filed May 28, 1958, Ser. No. 738,483
Claims priority, application Germany June 13, 1957
1 Claim. (Cl. 222—66)

This invention is concerned with a method and apparatus for conveying batches of milk from a lower level to a higher level, and metering the batches of milk conveyed.

In the delivery of milk to a central place where it is collected or processed, it happens frequently that the milk is poured into receptacles disposed at a low level, from which the milk must be removed by suction so as to convey it to desired points of delivery.

It has been customary until now, to use for the above indicated purpose self-priming suction pumps and to separate from the milk the air, which is conveyed therewith particularly at the start and conclusion of the operation, by means of a suitable separator at the pressure side of the pump. The amount of the milk is thereupon metered in the pressure line, by a suitable flow meter. Difficulties are thereby experienced so far as the limitation of the amounts of the individual batches is concerned, such limitation being required for the accurately calibrated metering of the batches and making it necessary to keep the liquid in the air separator, after the removal of each batch, always at the same level.

The invention proposes to overcome these difficulties by the provision of a method for conveying milk from a lower level to a higher level and metering it in batches, comprising the following steps, namely, first, sucking the milk into an air separator by vacuum produced by a vacuum pump, the use of a self-priming suction pump being avoided; second, separating the milk in the air separator from the air conveyed therewith; third, conveying the milk free of air, by its gravity, to the intake of a conveying pump; fourth, metering the amount of milk either in the suction or in the pressure line of the conveying pump; and fifth, limiting the batches by utilizing the liquid level in the air separator.

In accordance with the invention, the liquid level in the air separator is utilized (a) for governing the switching-in and disconnection of a vacuum pump or of a vacuum control valve, and (b) for governing the switching-in and disconnection of the motor of the conveying pump or of a milk control valve.

The invention also provides apparatus for practicing the above indicated method and for carrying out the corresponding functions, comprising individually known elements such as a vacuum pump, a milk conveying pump, level controls or indicators, flow meter, and control valves; such elements being according to the invention arranged and disposed in particular and novel manner.

The invention will now be described with reference to the accompanying drawing, in the single FIGURE, showing in schematic manner an embodiment of apparatus for practicing the invention.

Referring now to the drawing, numeral 1 indicates a receptable disposed at a low level, for receiving the milk. A duct in the form of a tube or hose 2 extends from the receptacle 1 to a known and suitable air separator 3, that is, a device for separating air from liquid. The air separator 3 contains level indicators or control means 9 and 12, disposed therein respectively at the upper and lower ends thereof. The level control 9 governs by way of the line 8 an electromagnetic valve 5 controlling the opening and closing of vacuum line 4 which terminates in the vacuum tank 6 at the bottom thereof. Numeral 7 indicates the vacuum pump for producing a vacuum in the tank 6 and also, by way of the line 4, a vacuum in the air separator 3. The vacuum obtaining in the air separator 3 causes the milk in the receptacle 1 to flow thereinto by way of the duct 2, the milk then flowing in the air separator 3 by gravity downwardly and thence by way of line 10 to the intake of the milk pump 11. The level control 12 is connected with the electric motor of the milk pump by way of line 17. The pump 11 conveys the milk by way of lines 13 and 16, containing a valve 18 as shown, to the flow meter 14 and from there to the line 15 which terminates at a desired delivery point. The level control means 9 and 12 may be floats or known electrically controlled devices.

Suitable means are, of course, provided for depositing milk in the receptacle 1; likewise, suitable and known means including suitable switches, are provided for supplying current to the various elements where needed.

The operation, so far as it is not clearly apparent from the foregoing explanations, is as follows:

Milk is conveyed from the receptacle 1 into the air separator 3, by suction produced by the vacuum obtaining therein, the milk collecting in the constricted bottom portion thereof and thus operatively affecting the level control 12 which switches-in the motor of the pump 11, the latter conveying the milk by way of the lines 13, 16 to the flow meter 14 where the amount of the milk is metered, and thence by way of line 15 for discharge at a desired point. The vacuum within the air separator 3 may be regulated as desired by means of a known and suitable control (not shown) at the vacuum pump. It is thus, for example, in continuous operation possible to feed to the air separator more milk in a unit of time than the milk conveying pump can handle. The liquid level in the air separator 3 will in such case rise to affect operatively the high liquid level control 9 which in turn causes operative actuation of the electromagnetic valve 5 to close the vacuum line 4. The milk level in the air separator 3 will thereupon drop as air entrained with the milk is separated therefrom; accordingly, upon dropping of the milk level below the high liquid level control 9, the electromagnetic valve 5 will again open the vacuum line 4, causing removal of the air from the air separator. Upon complete removal of a batch of milk from the receptacle 1, the milk level in the air separator 3 will drop to the contact point of the level control 12, thereby causing disconnection and stopping of the milk pump 11 by control over the line 17.

In order to provide for a volume limitation or control which is as accurate as possible, it will be advantageous to strongly constrict the air separator 3 at the point where the low level control 12 is located, so as to form at the corresponding place a liquid surface as small as possible, thereby reducing the error threshold to the smallest value that can be technologically achieved.

Other means, for example, suitable displacement or by-pass means may be provided in place of constricting the air separator as described, to achieve the same effect, namely, forming a liquid surface as small as possible.

It may be mentioned in conclusion, that a check valve may be provided in the riser conduit 13 so as to prevent back flow of milk in normal condition of the apparatus.

While the invention has been described in connection with a method and apparatus for conveying and metering milk, it will be understood that some or all features thereof may be applicable to the handling of other liquids. The term "milk" should accordingly be interpreted with sensible latitude to embrace any liquid that may be handled as disclosed herein.

Changes may accordingly be made within the scope and spirit of the appended claim.

I claim:

Apparatus for conveying batches of milk from a receptacle disposed at a low level to a point of discharge disposed at a higher level and for metering the milk conveyed, comprising a vertically extending air separator disposed at a level above said receptacle, a duct having its inlet end so disposed in said receptacle that normally only liquid will be admitted to said duct and its outlet end terminating in said air separator near the top thereof, a vacuum pump, a line operatively connecting said pump with the top of said air separator for producing a vacuum therein for the purpose of sucking thereinto milk from said receptacle for removal of air therefrom, a control valve in said line, high liquid level control means in said air separator for governing the operation of said control valve, said control means being operative when the liquid level in said separator reaches a predetermined operative maximum, the milk free of air dropping within said air separator by gravity to the bottom thereof, a further pump for removing the milk from said air separator by way of an intake connected therewith at the bottom thereof, means forming a constriction at the bottom of said air separator, low liquid level control means operatively positioned in the constriction in said air separator for governing the operation of said further pump, said last mentioned control means being independent of said high level liquid control means and operative when the liquid level in said separator reaches a predetermined operative minimum, a conveyor conduit connected with the pressure side of said further pump and terminating in a flow meter, and a discharge conduit connected with and extending from said flow meter.

References Cited in the file of this patent

UNITED STATES PATENTS

| 1,698,127 | Engstrand | Jan. 8, 1929 |
| 2,205,761 | Hallberg | June 25, 1940 |
| 2,280,287 | De Lancey | Apr. 21, 1942 |
| 2,669,941 | Stafford | Feb. 23, 1954 |
| 2,791,964 | Reeve | May 14, 1957 |
| 2,895,450 | Hope | July 21, 1959 |

FOREIGN PATENTS

| 1,184,494 | France | July 22, 1959 |